(12) United States Patent
Huddleston et al.

(10) Patent No.: US 6,179,470 B1
(45) Date of Patent: Jan. 30, 2001

(54) SELF-LUBRICATING BEARING

(75) Inventors: H. Mike Huddleston, Richmond; J. Roy Corwin, Centerville, both of IN (US)

(73) Assignee: Hoffco/Comet Industries, Inc., Richmond, IN (US)

( * ) Notice: Under 35 U.S.C. 154(b), the term of this patent shall be extended for 0 days.

(21) Appl. No.: 09/377,512

(22) Filed: Aug. 19, 1999

Related U.S. Application Data (60) Provisional application No. 60/097,079, filed on Aug. 19, 1998.

(51) Int. Cl.$^7$ ....................................................... F16C 33/66
(52) U.S. Cl. .......................... 384/279; 384/286; 384/381; 384/382; 384/907
(58) Field of Search .................................. 384/279, 286, 384/381, 382, 907

(56) References Cited

U.S. PATENT DOCUMENTS

| | | | |
|---|---|---|---|
| 3,823,802 | * | 7/1974 | Winzeler et al. . |
| 4,482,041 | * | 11/1984 | Ladin . |
| 4,534,458 | * | 8/1985 | Ladin . |
| 5,423,405 | * | 6/1995 | Fukaya . |
| 5,653,323 | * | 8/1997 | Rappaport . |

* cited by examiner

*Primary Examiner*—Lenard A. Footland
(74) *Attorney, Agent, or Firm*—Barnes & Thornburg

(57) ABSTRACT

According to the present invention, a bearing assembly includes a rotatable hub and a porous bearing surrounding the hub, a sprocket surrounding the bearing, and means for rotating the hub relative to the bearing. The porous bearing includes "lubricant channels" containing a lubricant and having inlet openings facing toward the sprocket and outlet openings facing toward the rotatable hub so that lubricant in the lubricant channels can exit through the outlet openings to lubricate the mating surfaces of the bearing and the rotatable hub. The porous bearing is permeable to fluids and thus capable of being penetrated by lubricants and greases and thus due to its porous character includes lubricant channels that function to conduct lubricants and greases from an outer surface of the porous bearing to an inner surface of the porous bearing through lubricant channels or pores formed in the porous bearing.

35 Claims, 4 Drawing Sheets

FIG. 3b

SELF-LUBRICATING BEARING

This application claims priority under U.S.C. § 119 (e) to U.S. Provisional Application No. 60/097,079 filed Aug. 19, 1998, which is expressly incorporated by reference herein.

BACKGROUND AND SUMMARY OF THE INVENTION

The present invention relates to a clutch assembly and particularly to a clutch assembly having a bearing component. More particularly, the present invention relates to a sleeve bearing within a clutch assembly which requires continual lubrication while the clutch assembly is running.

Various clutch assemblies are available which include some type of bearings or bearing assemblies. The bearings are kept lubricated while the clutch assembly is running in order to minimize the friction between the parts as much as possible. The lubricant most often used in a clutch assembly is a type of grease or oil.

According to the present invention, a bearing assembly includes a rotatable hub and a porous bearing surrounding the hub, a sprocket surrounding the bearing, and means for rotating the hub relative to the bearing. The porous bearing includes "lubricant channels" containing a lubricant and having inlet openings facing toward the sprocket and outlet openings facing toward the rotatable hub so that lubricant in the lubricant channels can exit through the outlet openings to lubricate the mating surfaces of the bearing and the rotatable hub. The porous bearing is permeable to fluids and thus capable of being penetrated by lubricants and greases and thus due to its porous character includes lubricant channels that function to conduct lubricants and greases from an outer surface of the porous bearing to an inner surface of the porous bearing through lubricant channels or pores formed in the porous bearing.

The sprocket includes a reservoir containing a grease which becomes fluid at a certain melting temperature and is thus able to pass out of the sprocket reservoir and through an annular space between the sprocket and the bearing into the lubricant channels formed in the bearing. Rotation of the hub relative to the bearing and the sprocket generates enough heat (that is transferred through the bearing to the grease reservoir) to melt a portion of the grease carried in the reservoir formed in the sprocket. Some of the melted grease flows out of the reservoir into the lubricant channels or pores formed in the bearing to replace lubricant that has evaporated from an interface between the bearing and the rotatable hub during rotation of the hub relative to the bearing. This transfer of grease from the sprocket reservoir to a bearing/hub interface through the lubricant channels or pores formed in the bearing takes place slowly over a long period of time so that the bearing/hub interface is lubricated continually by the grease transferred from the sprocket reservoir as the hub rotates relative to the bearing and the sprocket and heat is generated to melt some of the grease in the sprocket reservoir and the melted greases passes into and through the porous bearing to reach the bearing/hub interface.

In preferred embodiments, the sprocket includes a tubular member having a cylindrical inner surface defining a passageway containing the bearing and an outer surface carrying sprocket teeth. The porous bearing is an elongated sleeve bearing surrounding the hub so that the hub is mounted for rotation within a passageway formed in the bearing. The bearing is mounted in the sprocket passageway so that inlet openings in the lubricant channels or pores formed in the bearing always face toward the cylindrical inner surface and outlet openings in the lubricant channels or pores always face toward the rotatable hub.

Two annular grooves are formed in the tubular member of the sprocket and arranged to open into the passageway containing the bearing to provide the grease reservoir in the sprocket. These annular grooves are arranged to lie in spaced-apart relation to one another along the length of the bearing so that one annular groove is near to a first end of the sleeve bearing and the other annular groove is near to a second end of the sleeve bearing.

The two annular grooves are filled with a bearing grease that becomes fluid in the presence of heat generated by rotation of the hub within the passageway formed in the bearing. As the hub is rotated, heat passes through the non-rotating bearing to reach the bearing grease in the grease reservoir and heated fluidized grease passes out of the grease reservoir defined by the two annular grooves formed in the sprocket into and through the lubricant channels or pores formed in the porous bearing to reach the bearing/hub interface to ensure that the bearing is lubricated properly as the hub rotates relative to the bearing and sprocket even as original lubricant evaporates and leaves the bearing/hub interface.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is an exploded perspective view showing the clutch assembly of the present invention including a rotatable hub and side plate sub-assembly, six curved shoes, a spring to be inserted within a channel of the shoes, a side plate cover for keeping the spring within the channel, an outer drum for housing the aforementioned members and coupling with a sprocket (shown with portions broken away), a cylindrical sleeve bearing having lubricant channels or pores impregnated with a lubricant and sized to be received within a passageway formed in the sprocket, and a keyed shaft to be coupled to the rotatable hub, and also showing the sprocket having two annular grooves formed within an inner surface of the sprocket to provide a reservoir containing grease to be used to lubricate a bearing/hub interface during rotation of the hub relative to the bearing;

DETAILED DESCRIPTION OF THE DRAWINGS

Clutch assembly 10 is a four-inch centrifugal clutch and is provided to be used with any type of mechanism which runs at different speeds such as go-karts, lawn mowers, and other mobile apparatus, for example. A clutch is a machine element associated with rotation for the connection and disconnection of shafts in equipment drives. Clutch assembly 10 functions to transfer rotational energy from one body to another.

Clutch assembly 10 includes a sprocket 14, a sleeve bearing 12 received within sprocket 14, and a rotatable hub 22 powered by a motor (not shown) and received within a passageway 114 formed in bearing 12 so that bearing 12 surrounds rotatable hub 22 and sprocket 14 surrounds bearing 12. Sprocket 14 operates to receive a chain (not shown) and is activated to rotate with bearing 12 at higher speeds. Bearing 12 operates to reduce friction between sprocket 14 and rotatable hub 22. At slower speeds, rotatable hub 22 rotates relative to bearing 12 and sprocket 14 which both remain stationary.

Figure 3A:
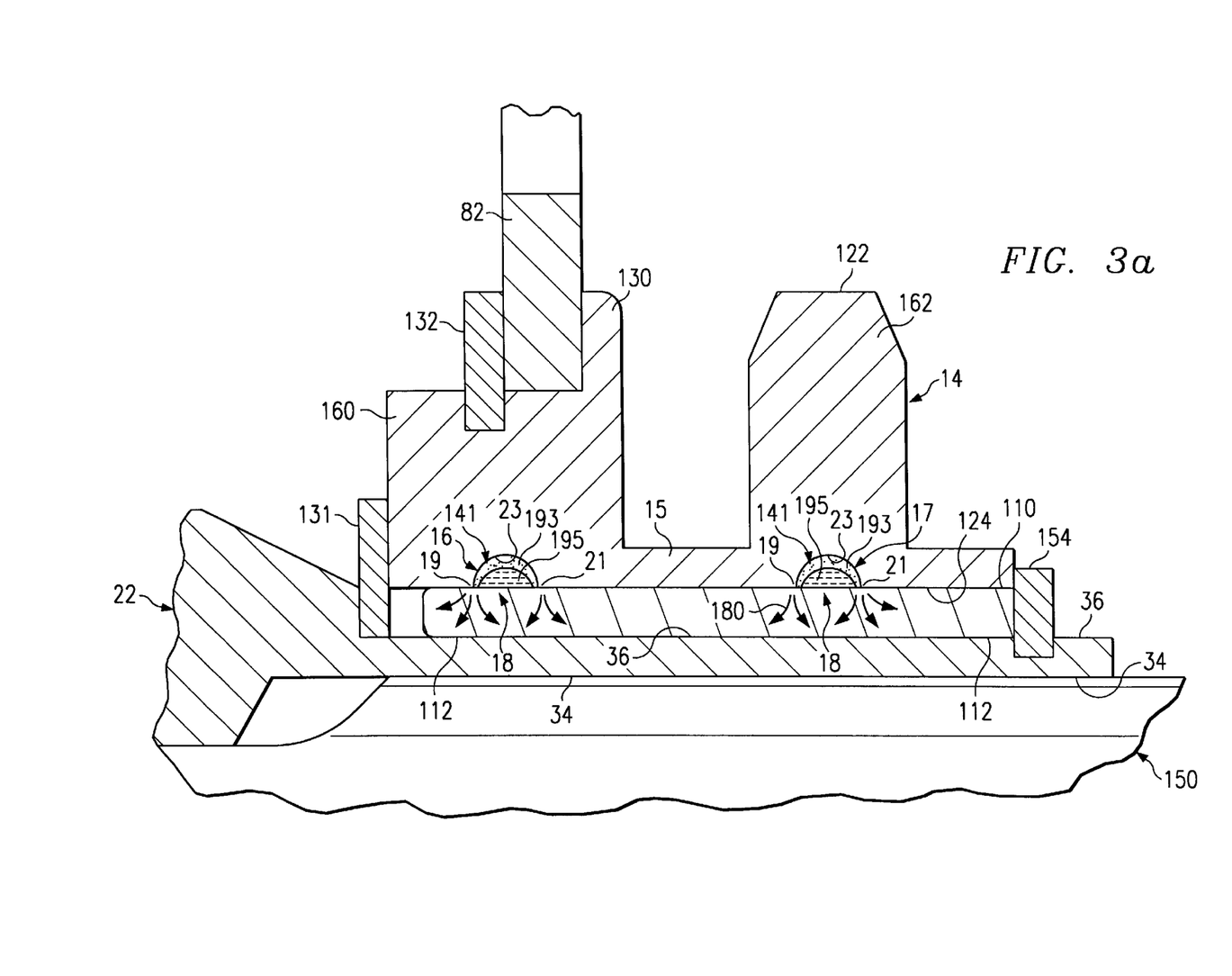
FIG. 3a is an enlarged sectional view of a portion of FIG. 2 showing portions of the sprocket, bearing, and rotatable hub wherein the hub is rotating relative to the bearing and sprocket so that heat generated due to friction between the bearing and the rotatable hub causes the grease housed within the annular grooves of the sprocket to melt and re-impregnate the bearing with lubricant in the form of the melted grease.
Figure 3B:
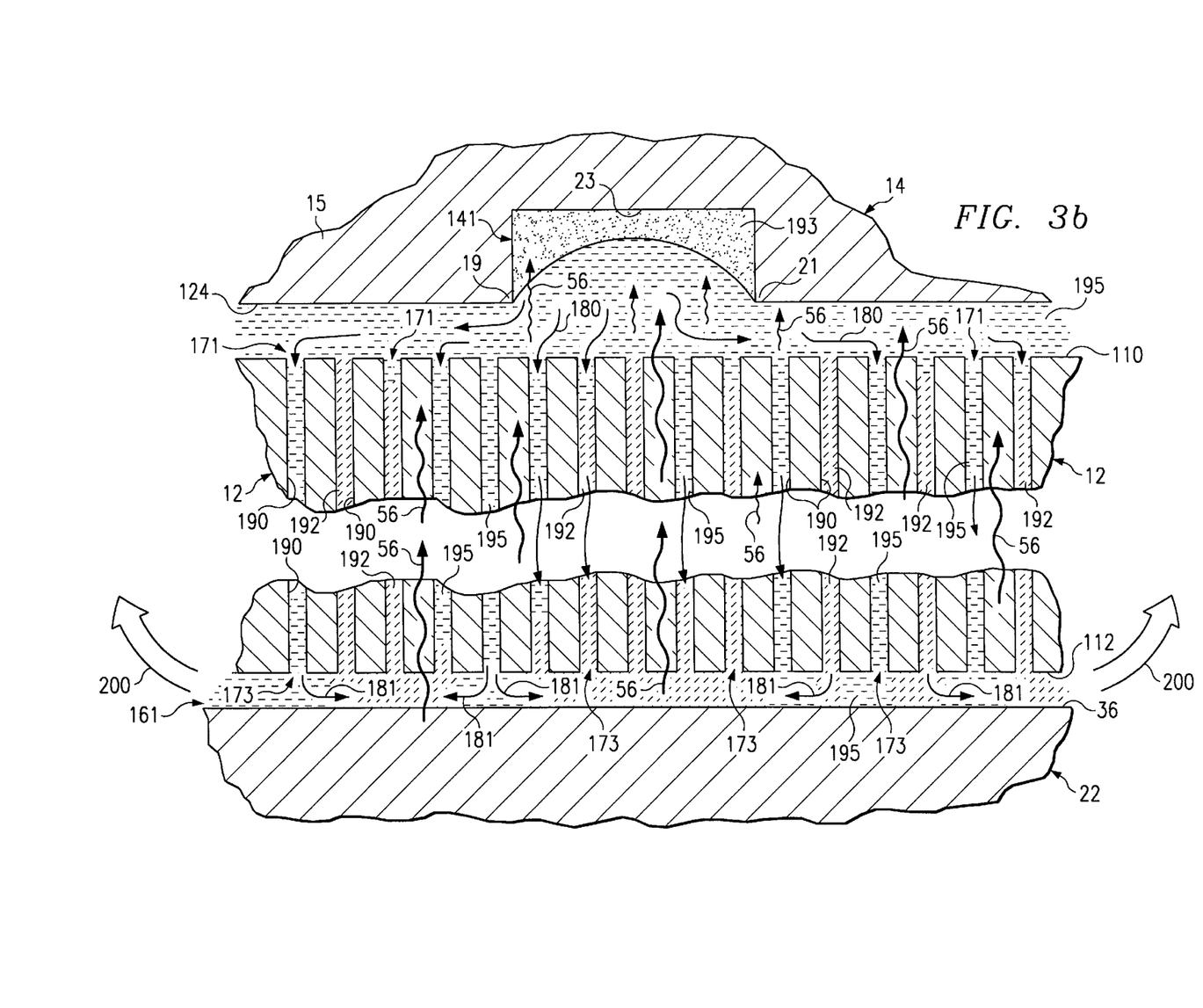
FIG. 3b is a diagrammatic view of a portion of FIG. 3a showing lubricant channels of the bearing which are filled or partially filled with lubricant and showing some of the grease contained within one of the grooves of the sprocket having changed to a fluid-like state and flowing along a length of an outer surface of the bearing into the lubricant channels of the bearing, and through the bearing to the rotatable hub at the bearing/hub interface in order to continually lubricate an outer surface of the rotatable hub positioned to lie adjacent to an inner surface of the bearing.

Referring now to FIG. 3b, bearing 12 is made of a porous material permeable to fluids and includes lubricant channels or pores 190 formed to extend through bearing 12 from an outer surface 110 of bearing 12 to an inner surface 112 of bearing 12. Lubricant channels 190 are filled with a lubricant 192 which reduces the friction between rotatable hub 22 and bearing 12 at a bearing/hub interface 161. Each lubricant channel 190 is a pore or network of pores formed in the porous bearing and thus is formed to include an inlet opening 171 positioned to lie adjacent to sprocket 14 and an outlet opening 173 positioned to lie adjacent to rotatable hub 22 at the bearing/hub interface 161. As temperatures rise due to friction created at bearing/hub interface 161, some of lubricant 192 evaporates lubricant channels 190, as shown diagrammatically by arrow 200 in FIG. 3b, leaving lubricant channels 190 filled, partially filled, or empty. Further, inner surface 112 of bearing 12 is formed to define bearing passageway 114 which receives rotatable hub 22 therein.

Sprocket 14 includes a tubular member 15 having a cylindrical inner surface 124 defining a passageway 126 which contains bearing 12 therein. Two annular grooves 16, 17 are formed in tubular member 15 and arranged to open into passageway 126 containing bearing 12 to provide a grease reservoir for containing grease 141 therein. Grease 141 is normally in a solid-like state forming solid-like grease 193 but changes to a fluid-like grease 195 in the presence of heat generated by the rotation of rotatable hub 22 relative to bearing 12. The heat which is generated between bearing 12 and rotatable hub 22 at bearing/hub interface 161 propagates through bearing 12 from inner surface 112 to outer surface 110 of bearing 12 to heat inner surface 124 of sprocket 14 to heat grease 141, as shown in FIG. 3b. As grease 141 is heated, fluid-like grease 195 passes out of annular grooves 16, 17 into vacant or partially vacant lubricant channels 190 via inlet openings 171 in order to keep lubricant channels 190 filled to provide continual lubrication to rotatable hub 22 at bearing/hub interface 161.

Clutch assembly 10 is generally operational in two different modes: a first mode operating at a low speed where only certain components of assembly 10 are urged to rotate at the low speed while other components of the assembly remain stationary and a second mode operating at a high speed where centrifugal forces cause the entire assembly to rotate at the high speed. At the low speed, high frictional forces exist between rotating and non-rotating components. Sleeve bearing 12, having lubricant channels 190 impregnated with lubricant 192 and configured to receive fluid-like grease 195 from grooves 16, 17 of sprocket 14, is therefore provided so that an area between the rotating and non-rotating components at bearing/hub interface 161 is continually lubricated in order to reduce the frictional forces.

Figure 1:
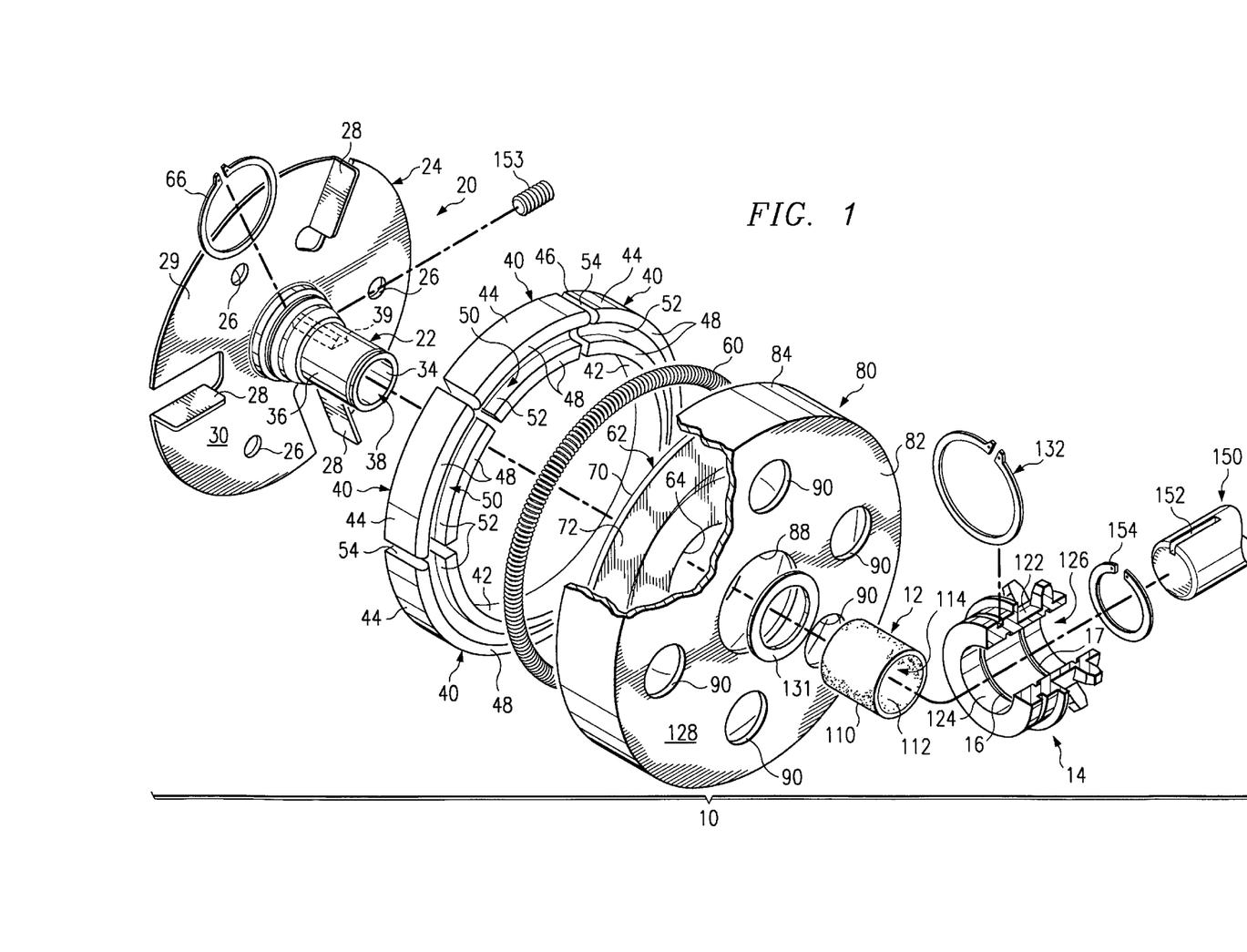

Sprocket 14 is provided, as shown in FIG. 1, with portions broken away, so that it can be seen that sprocket 14 includes two annular grooves 16, 17 which define a reservoir for housing grease 141 such as Bison Grease provided by American Lubricants, for example. As will be explained later in greater detail, the frictional forces mentioned above occur between rotatable hub 22 and bearing 12 when clutch assembly 10 is operating at a first mode where rotatable hub 22 rotates relative to bearing 12. These frictional forces essentially generate heat which travels through bearing 12, as shown by arrows 56 in FIG. 3b, in order to gradually melt grease 141 contained in grooves 16, 17 to lubricate and re-impregnate bearing 12 with fluid-like grease 195.

As shown in FIG. 3b, grease 141 is contained within grooves 16, 17 and is normally in a solid-like state to provide solid-like grease 193. The heat, as shown by arrows 56, melts solid-like grease 193 to produce fluid-like grease 195 which can flow into any available lubricant channel 190 as shown by arrows 180. Once fluid-like grease 195 travels through lubricant channels 190 toward rotatable hub 22, fluid-like grease 195 exits through outlet openings 173 to be distributed along the length of rotatable hub 22, as shown by arrows 181. The features of bearing 12 and sprocket 14 and the process by which bearing 12 is continually lubricated will be described later in more detail.

Clutch assembly 10 includes components which operate to provide continual lubrication at bearing/hub interface 161. Each of the components is described below as follows. Referring to FIG. 1, clutch assembly 10 is formed to include a sub-assembly 20 having rotatable hub 22 and a side plate 24 coupled to hub 22. Side plate 24 is formed to include three apertures 26 which are provided for manufacturing purposes. Side plate 24 also includes a flat disk portion 29 and three L-shaped tabs 28 which are punched out of flat disk portion 29 and are formed to extend at right angles to an inner surface 30 of flat disk portion 29 thereby forming slots 31 in flat disk portion 29.

Rotatable hub 22 is formed to extend through a center aperture 32 of side plate 24 so that side plate 24 is received within a first groove 33 of rotatable hub 22. Rotatable hub 22 is hollow and is thus formed to include an inner surface 34 and an outer surface 36. Rotatable hub 22 also includes an inner cavity 38 defined by inner surface 34 and a key 39 formed to extend from inner surface 34 into cavity 38. As stated before, rotatable hub 22 is received within passageway 114 of bearing 12 so that outer surface 36 of rotatable hub 22 is positioned to lie adjacent to inner surface 112 of bearing 12 thereby creating bearing/hub interface 161.

Figure 2:
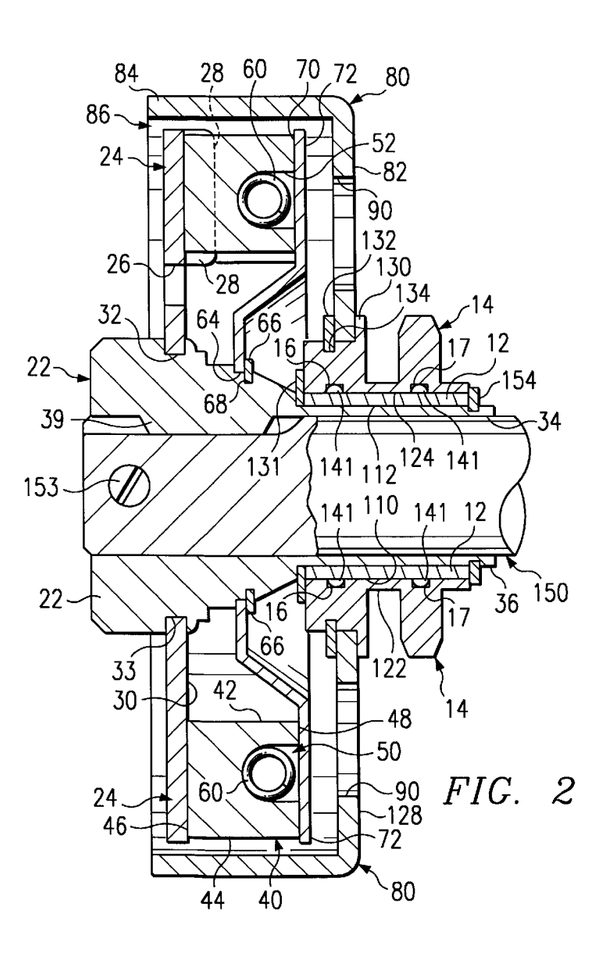
FIG. 2 is a sectional view showing the clutch assembly fully assembled and running at idle so that the rotatable hub and side plate sub-assembly, shoes, spring, and side plate cover are all rotating at a lowered speed so that the shoes are in a retracted position while the drum, sprocket, and bearing remain stationary.
Figure 4:
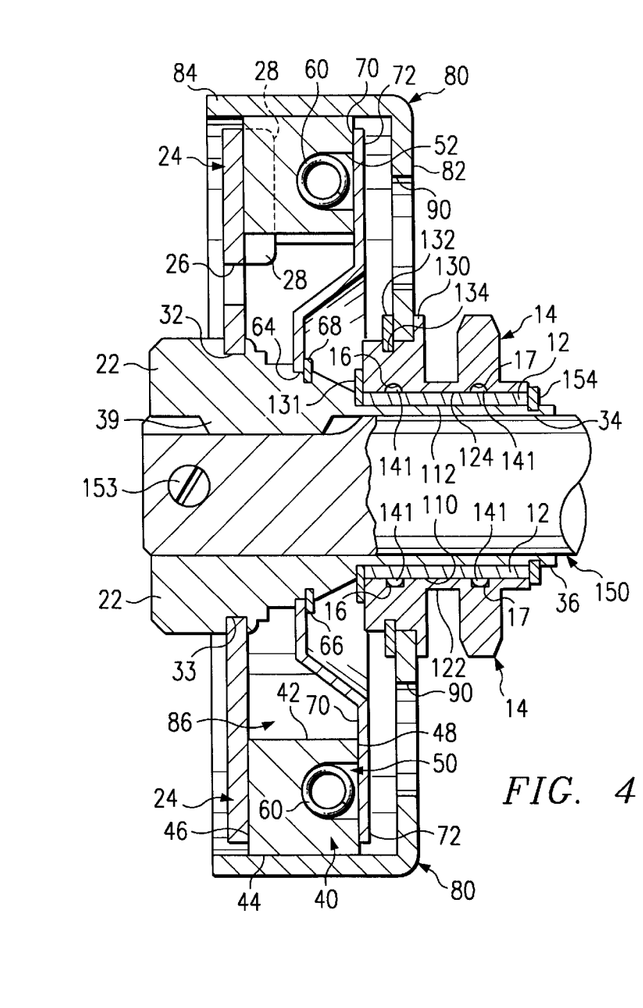
FIG. 4 is a sectional view similar to FIG. 2 showing the shoes in an extended position due to the centrifugal forces caused by an increase in the rotational speed of the rotatable hub urging the shoes to move radially outward and contact the outer drum thereby causing the outer drum, sprocket, and bearing to rotate at the same speed as the shoes so that each part of the clutch assembly rotates at the same speed.

Six curved shoes 40 forming a ring are provided in clutch assembly 10 and are shown in FIG. 1. Although six shoes 40 are provided, it is within the scope of the disclosure to include a clutch assembly with any number of shoes. Each shoe 40 is formed to include a curved inner surface 42, a drum-engaging, curved outer surface 44, a first side surface 46, and a second side surface 48. A U-shaped channel 50 is formed within second side surface 48 and is defined by an inner channel surface 52, therein. First side surface 46 of each shoe 40 is formed to engage inner surface 30 of side plate 24, as shown in FIGS. 2 and 4. Each L-shaped tab 28 of side plate 24 is also positioned to engage a first end 54 of a respective shoe 40. However, because there are three L-shaped tabs 28 and six shoes 40, L-shaped tabs 28 are positioned to engage first ends 54 of alternating shoes 40.

An annular spring 60 is provided in clutch assembly 10 and is sized to be received within U-shaped channel 50 defined by shoes 40. Spring 60 acts to hold shoes 40 together in a retracted, first position, as shown in FIG. 2. A side plate cover 62 is provided in order to ensure spring 60 remains within channel 50 when hub 22, side plate 24, and shoes 40 are rotating. Side plate cover 62 is formed to include an aperture 64 so that hub 22 may extend through aperture 64. A first retaining ring 66 is positioned to lie in a second groove 68 of hub 22 in order to hold side plate cover 62 in place around hub 22, as shown in FIGS. 2 and 4. A first surface 70 and a second surface 72 of side plate cover 62 are provided so that first surface 70 remains in contact with each second side surface 48 of shoes 40 with the aid of first retaining ring 66.

Clutch assembly 10 further includes an outer drum 80 having a body portion 82 and an outer lip 84 extending about a perimeter of body portion 82. Side plate 24, portions of rotatable hub 22, shoes 40, spring 60, side plate cover 62, and first retaining ring 66 are all positioned to lie within a cavity 86 defined by body portion 82 and outer lip 84 of drum 80. Drum 80 is formed to include a center aperture 88 extending through body portion 82 and four additional apertures 90 also extending through body portion 82 and located around center aperture 88.

As mentioned before, bearing 12 is a sleeve bearing and is formed to include outer surface 110, inner surface 112, and passageway 114 defined by inner surface 112, as shown in FIG. 1. Bearing 12 is formed to receive rotatable hub 22 within passageway 114 so that outer surface 36 of hub 22 engages and lies adjacent to inner surface 112 of bearing 12, as shown in FIGS. 2 and 4. Rotatable hub 22 rotates relative to bearing 12 when clutch assembly 10 is operating in the first mode thereby creating frictional forces between outer surface 36 of rotatable hub 22 and inner surface 112 of bearing 12 at bearing/hub interface 161.

Bearing 12 is made from a porous material and includes lubricant channels 190 impregnated with lubricant 192, as shown in FIG. 3b. Each lubricant channel 190 includes inlet opening 171 facing inner surface 124 of sprocket 14 and outlet opening 173 facing outer surface 36 of rotatable hub 22. Specifically, in preferred embodiments, bearing 12 is an oil-impregnated powdered metal bearing.

As shown in FIG. 1, sprocket 14 is included in clutch assembly 10 and is formed to include tubular member 15 having cylindrical inner surface 124. Sprocket 14 further includes an outer surface 122 and passageway 126 defined by inner surface 124 of tubular member 15. Bearing 12 is received within passageway 126 of sprocket 14 so that inner surface 124 of sprocket 14 engages outer surface 110 of bearing 12, as shown in FIGS. 2 and 4. Sprocket 14 is press-fit onto bearing 12 so that sprocket 14 and bearing 12 are fixed to each other and urged to rotate together. Rotatable hub 22 is rotatable relative to bearing 12 and sprocket 14 when clutch assembly 10 operates at a first mode in order to create frictional forces between rotatable hub 22 and bearing 12 at bearing/hub interface 161. The frictional forces produce the heat, as shown by arrows 56 in FIG. 3b, that melts grease 141 from solid-like grease 193 to fluid-like grease 195.

Sprocket 14 is further formed to include a base 160 and sprocket teeth 162 positioned to lie in spaced-apart relation to base 160. Base 160 and sprocket teeth 162 are each coupled to tubular member 15. Sprocket teeth 162 are shown, for example, in FIG. 1 and are provided to receive a chain (not shown) thereon. In relation to clutch assembly 10, sprocket 14 is formed to extend through center aperture 88 of drum 80 so that an outer surface 128 of body portion 82 of drum 80 is positioned to engage a lip 130 formed to extend from outer surface 122 of base 160 of sprocket 14. Rotatable hub 22 is positioned to extend through a washer 131 so that washer 131 abuts bearing 12 and sprocket 14, as shown in FIGS. 2, 3a, and 4. Clutch assembly 10 includes a second retaining ring 132 to be received within an outer groove 134 formed in outer surface 122 of sprocket 14. Second retaining ring 132 is provided to maintain the positioning of drum 80 relative to sprocket 14.

In order to lubricate bearing 12 continually, sprocket 14 is further formed to include a reservoir defined by two annular grooves 16, 17 each having an opening 18 formed within inner surface 124, as shown in FIG. 1. Each annular groove is further defined by a U-shaped interior wall 23 positioned to extend between first and second edges 19, 21 of sprocket 14, as shown in FIG. 3a. Each annular grove 16, 17 is filled with grease 141, as shown in FIG. 3a, in order to re-impregnate lubricant channels 190 of bearing 12 during operation of clutch assembly 10. Grease 141 is formed to remain at a first state at a first temperature to provide solid-like grease 193 and is configured to change to a second fluid-like state to provide fluid-like grease 195. Fluid-like grease 195 flows out of annular grooves 16, 17 of sprocket 14 through inlet openings 171 and into lubricant channels 190 of porous bearing 12, as shown, for example, by arrows 180 in FIG. 3b. Fluid-like grease 195 then continues to flow through outlet openings 173 of lubricant channels 190 onto bearing/hub interface 161.

Clutch assembly 10 is also formed to include a keyed shaft 150 including a keyway 152. Shaft 150 is formed to be received within hollow portion 38 of rotatable hub 22 so that key 39 of rotatable hub 22 is received within keyway 152 of shaft 150. This keyed relationship between rotatable hub 22 and shaft 150 allows shaft 150 to be aligned properly with respect to rotatable hub 22. A screw 153 holds shaft 150 securely in place within hub 22 and a final retaining ring 154 is provided in order to secure bearing 12 and sprocket 14 around rotatable hub 22.

Clutch assembly 10 has two modes of operation. In the first mode of operation, which is shown in FIGS. 2 and 3, clutch assembly 10 runs at idle where the motor (not shown) drives rotatable hub 22 to rotate at some pre-defined lower speed. At this lower speed, rotatable hub 22 with side plate 24, and shaft 150 are urged to rotate. Tabs 28, of side plate 24, engage first end 54 of respective shoes 40 and urge each respective adjacent shoe 40 to rotate with side plate 24. Each shoe 40 in which first end 54 is not engaged by an L-shaped tab 28 is urged to rotate by an adjacent shoe 40 so that all six shoes 40 rotate in unison with side plate 24, rotatable hub 22, and shaft 150. At the lower speed first mode of operation, the resistance provided by spring 60 holds shoes 40 in the first, retracted position shown in FIG. 2. In other words, the centrifugal force seen by shoes 40 and provided by rotatable hub 22 is not great enough to overcome the strength characteristics (or spring constant) of spring 60 and thus shoes 40 are not urged to move radially outward.

In the first mode of operation, drum 80, bearing 12, and sprocket 14 remain stationary while the previously mentioned components rotate. Because rotatable hub 22 is adjacent to and therefore rotates relative to bearing 12 and sprocket 14, frictional forces are generated between outer surface 36 of rotatable hub 22 and inner surface 112 of bearing 12 at bearing/hub interface 161. These frictional forces generate heat, as shown by arrows 56, between bearing 12 and rotatable hub 22. This heat propagates through bearing 12 to sprocket 14.

Referring now to FIGS. 3a and 3b, the heat generated causes grease 141 contained within annular grooves 16, 17 of sprocket 14 to melt from solid-like grease 193 to fluid-like grease 195, as shown, for example, in FIG. 3b. The heat which is generated, as shown in FIG. 3b by arrows 56, also causes lubricant 192 contained within lubricant channels 190 of bearing 12 to dissipate or evaporate at bearing/hub interface 161, as shown diagrammatically by arrows 200 in FIG. 3b, leaving some of the lubricant channels 190 vacant or partially vacant. Fluid-like grease 195 then flows from each annular groove 16, 17 (as shown by arrows 180) across outer surface 110 of bearing 12 and into the vacant and partially vacant lubricant channels 190 in order to re-impregnate bearing 12. As lubricant 192 evaporates at bearing/hub interface 161, fluid-like grease 195 flows through lubricant channels 190 to exit at outlet openings 173 providing bearing/hub interface 161 with a mixture of lubricant 192 and fluid-like grease 195 each of which may continue to evaporate due to continued heat generation.

In preferred embodiments, bearing 12 is formed from a powdered metal which is made to absorb lubricant 192 within lubricant channels 190. Lubricant 192 acts to reduce the frictional forces between bearing 12 and rotator hub 22 at bearing/hub interface 161 when clutch assembly 10 is operating at the first mode. Lubricant 192 is normally contained within lubricant channels 190 of bearing 12. During operation, however, some of the lubricant 192 is gradually depleted due to evaporation caused by the heat, as shown by arrows 56, which is generated. The heat travels from inner surface 112 of bearing 12 to outer surface 110 of bearing 12 and to inner surface 124 of sprocket 14 to heat grease 141. Grease 141 is formed to remain at a first, solid-like state at about a first temperature to provide solid-like grease 193. Once grease 141 reaches a certain higher second temperature, it changes to a second, fluid-like state to provide as fluid-like grease 195. Fluid-like grease 195 in order to flow out of grooves 16, 17 of sprocket 14 and into lubricant channels 190 of bearing 12 which have been depleted of lubricant 192.

As grease 141 melts, it therefore re-impregnates porous bearing 12 to extend the life of bearing 12 during operation of clutch assembly 10. Although porous bearing 12 is impregnated with lubricant 192, the frictional forces generated during the first mode of operation produce heat which depletes what lubricant 192 had been impregnated within lubricant channels 190 of bearing 12. Grease 141 within grooves 16, 17 is thus able to provide a slow and gradual, yet long-lasting, dissipation of grease 141 into lubricant channels 190 to re-impregnate bearing 12.

In the second mode of operation, shown in FIG. 4, the speed of the motor is increased thus increasing the rotational speed of hub 22 and side plate 24. Because tabs 28 drive shoes 40, the rotational speed of shoes 40 additionally increases thus increasing the centrifugal forces seen by shoes 40. At a specific, pre-determined speed, the centrifugal forces will become greater than the strength of spring 60 acting to hold shoes 40 in the retracted position. Once the centrifugal forces are greater than the biasing forces of spring 60, shoes 40 are urged to move radially outward away from hub 22 and against the bias of spring 60 until shoes 40 come into contact with outer lip 84 of drum 80. Specifically, outer surface 44 of each shoe is urge to engage outer lip 84, as shown in FIG. 4. At this time, the frictional forces present between shoes 40 and outer lip 84 of drum 80 urge drum 80 to rotate with shoes 40. As drum 80 is urged to rotate, sprocket 14 coupled to drum 80 and bearing 12, are also urged to rotate at the same speed. Therefore, in the second mode of operation, all components of clutch assembly 10 are rotating at the same raised speed so that the frictional forces previously seen between bearing 12 and hub 22 are no longer present.

Although the invention has been described in detail with reference to certain preferred embodiments, variations and modifications exist within the scope and spirit of the invention as described and defined in the following claims.

What is claimed is:

1. A bearing assembly comprising
   a rotatable hub,
   a porous bearing surrounding the rotatable hub to establish a bearing/hub interface therebetween and lubricant channels containing a lubricant, the lubricant channels having outlets arranged to dispense lubricant to the bearing/hub interface and grease receiving inlets,
   a sprocket surrounding the bearing and providing a reservoir containing a grease which becomes fluid at about a certain temperature and is able to pass into and through the lubricant formed in the bearing, and
   means for rotating the hub relative to the bearing about an axis to generate heat in the reservoir to melt some of the grease carried in the reservoir formed in the sprocket to flow some of the grease out of the reservoir into and through the lubricant channels formed in the bearing to reach the bearing/hub interface to replace lubricant that has evaporated from the bearing/hub interface during rotation of the hub relative to the bearing so that the hub is lubricated continually as it rotates relative to the bearing.

2. The bearing assembly of claim 1, wherein the sprocket is formed to include an outer surface and an inner surface and a tubular member forming the reservoir is formed to include an opening in the inner surface of the sprocket.

3. The bearing assembly of claim 2, wherein the sprocket is formed to include a first annular groove having an opening in the inner surface of the sprocket and defining the reservoir.

4. The bearing assembly of claim 3, wherein the sprocket is further formed to include a second annular groove having an opening in the inner surface of the sprocket and being positioned to lie in spaced-apart relation to the first annular groove.

5. The bearing assembly of claim 4, wherein the sprocket is formed to include a base and a set of sprocket teeth coupled to the tubular member and positioned to lie in spaced-apart relation to the base, the base is formed to include the first annular grove, and the set of sprocket teeth is formed to include the second annular grove.

6. The bearing assembly of claim 3, wherein the first annular groove is defined by a U-shaped interior wall included in the sprocket.

7. The bearing assembly of claim 1, wherein the sprocket is formed to include a first annular groove defining the reservoir and a second annular groove positioned to lie in spaced-apart relation to the first annular groove, the bearing is formed to include a first end and a second end spaced-apart from the first end, and the sprocket is formed to position the first annular groove adjacent to the first end of the bearing and the second annular groove adjacent to the second end of the bearing.

8. The bearing assembly of claim 7, wherein each of the first and second annular grooves is formed to include a width W along a length of the bearing, and a depth, D orthogonal to the width W, and W is greater than D.

9. The bearing assembly of claim 7, wherein the sprocket is formed to include a first end and a second end spaced-apart a distance "X" from the first end, the first annular groove is positioned to lie a distance 0.25X from the first end, and the second annular groove is positioned to lie a distance 0.25X from the second end.

10. The bearing assembly of claim 1, wherein the sprocket is formed to include another reservoir positioned to lie in spaced-apart relation to said reservoir and the other reservoir contains grease therein.

11. The bearing assembly of claim 10, wherein each reservoir is defined by an annular groove having an opening formed in the inner surface of the sprocket.

12. A bearing assembly comprising
a sprocket having an inner surface, an outer surface, and a passageway defined by the inner surface,
a rotatable hub,
a bearing positioned to lie within the passageway of the sprocket so that an outer surface of the bearing faces the inner surface of the sprocket, the bearing being formed to include a passageway receiving the rotatable hub therein to establish a bearing/hub interface therebetween and lubricant channels having inlet openings formed in the outer surface of the bearing and outlet openings communicating lubricant in the lubricant channels to the bearing/hub interface, the sprocket also being formed to include a reservoir facing toward the outer surface of the bearing, and
a grease positioned to lie in the reservoir formed in the sprocket to remain at a first state at about a first temperature, the grease being configured to change to a second fluid-like state and flow out of the reservoir of the sprocket into and through the lubricant channels to reach the bearing/hub interface and lubricate the hub as the hub rotates relative to the bearing once the temperature of the grease is raised to about a certain second temperature by heat generated at the bearing/hub interface and transferred through the bearing to the grease in the reservoir.

13. The bearing assembly of claim 12, wherein the bearing assembly includes a hub rotator coupled to the hub to rotate the hub relative to the bearing and sprocket to generate heat to cause the grease to change from the first state to the second state.

14. The bearing assembly of claim 12, wherein the sprocket is formed to include a first groove defining a first portion of the reservoir.

15. The bearing assembly of claim 14, wherein the sprocket is formed to include a second groove positioned to lie in spaced-apart relation to the first groove to define a second portion of the reservoir.

16. The bearing assembly of claim 15, wherein the inner surface of the sprocket forms a cylinder and the each of the first and second grooves includes an opening in the inner surface of the sprocket, each opening is defined by a pair of spaced-apart edges, and each pair of edges is formed to extend about the cylinder.

17. The bearing assembly of claim 15, wherein the sprocket is formed to include a tubular member forming the inner surface, a base coupled to the tubular member, and a set of sprocket teeth positioned to lie in spaced-apart relation to the base, and the base is formed to include the first groove and the set of sprocket teeth is formed to include the second groove.

18. The bearing assembly of claim 17, wherein the bearing is cylindrical in shape and is positioned to lie within the passageway of the sprocket, the bearing is formed to include a first end and a second end, and the sprocket is positioned so that the first annular groove is positioned to lie near the first end of the bearing and the second annular groove is positioned to lie near the second end of the bearing.

19. The bearing assembly of claim 14, wherein the first groove includes an opening formed in the inner surface of the sprocket.

20. The bearing assembly of claim 14, wherein the first groove of the sprocket is defined by a U-shaped interior wall included in the sprocket.

21. The bearing assembly of claim 20, wherein the first groove is formed to include a width W positioned to lie along a length of the bearing, and a depth D orthogonal to the width W, and W is greater than D.

22. The bearing assembly of claim 12, wherein the reservoir has an opening formed in the inner surface of the sprocket.

23. The bearing assembly of claim 22, wherein the inner surface of the sprocket is formed to define a cylinder, the sprocket is formed to include an annular groove defining the reservoir, and the opening of the annular groove is defined by a pair of spaced-apart edges included in the sprocket and positioned to extend about the inner surface of the sprocket.

24. The bearing assembly of claim 23, wherein the tubular member of the sprocket includes a U-shaped interior wall which defines the annular groove and a central axis of a cross-section of the groove is generally perpendicular to a central axis of the bearing.

25. A bearing assembly comprising
a rotatable hub,
a sleeve bearing surrounding the rotatable hub to establish a bearing/hub interface therebetween, the sleeve bearing having lubricant channels containing a first lubricant therein,
a sprocket positioned to surround the sleeve bearing and formed to include two annular grooves,
a second lubricant positioned to lie within the annular grooves of the sprocket, the second lubricant being normally at a first state at about a first temperature and changing to a second fluid-like state at about a certain second elevated temperature, and
means for rotating the hub relative to the bearing about an axis to produce heat to change the second lubricant carried within the annular grooves formed in the sprocket from the first state to the second state so that the second lubricant flows out of the grooves and to the bearing/hub interface through the lubricant channels formed in the sleeve bearing.

26. The bearing assembly of claim 25, wherein the sleeve bearing is formed to include a longitudinal passageway receiving the rotatable hub therein.

27. The bearing assembly of claim 26, wherein each annular grove is defined by a U-shaped interior wall included in the sprocket.

28. The bearing assembly of claim 25, wherein the sprocket is formed to include an inner surface and an outer surface, the inner surface defines a passageway formed to receive the bearing therein, the sprocket further includes a first end and a second end, the first annular groove of the sprocket is positioned to lie near the first end, and the second annular groove is positioned to lie near the second end.

29. The bearing assembly of claim 28, wherein the first and second annular grooves of the sprocket are defined by a U-shaped interior wall included in the sprocket and positioned to extend about the inner surface of the sprocket.

30. The bearing assembly of claim 28, wherein a cross-section of the U-shaped annular groove includes a central axis and the central axis is positioned to lie generally perpendicular to a central axis of the bearing rotates.

31. A bearing assembly comprising a sprocket having an outer surface, an inner surface, the inner surface forming at least one U-shaped groove defined by spaced-apart edges of the sprocket which extend annularly about the inner surface, the inner surface of the sprocket defining a passageway, a rotatable hub, a bearing surrounding the rotatable hub to establish a bearing/hub interface therebetween, the bearing having lubricant channels containing a first lubricant therein and dispensing the first lubricant to the bearing/hub interface, the bearing being received within the passageway of the sprocket and being formed to include an outer surface positioned to face the inner surface of the sprocket and formed to include inlets opening into the lubricant channels, a second lubricant that is in a solid-like state at about a first temperature and changes to a fluid-like state at about an elevated second temperature, the second lubricant being contained within at least one groove of the sprocket when in the solid-like state and the second lubricant formed to flow into and through lubricant channels of the bearing to reach the bearing/hub interface when in the fluid-like state, and means for rotating the hub relative to the bearing in order to change the second lubricant from the solid-like state to the fluid-like state so that the second lubricant flows through the lubricant channels to reach the bearing/hub interface to replace first lubricant therein.

32. The bearing assembly of claim 31, wherein the bearing is formed to include a longitudinal passageway receiving the rotatable hub therein.

33. The bearing assembly of claim 32, wherein the sprocket is formed to include a base positioned to lie at a first end of the sprocket and a set of sprocket teeth positioned to lie at a second end of the sprocket, the sprocket is further formed to include a first annular groove and a second annular groove positioned to lie in spaced-apart relation to the first annular groove, the base includes the first annular groove and the set of sprocket teeth includes the second annular groove.

34. The bearing assembly of claim 33, wherein the distance from the first end of the sprocket to the second end of the sprocket is X and the first annular groove is positioned to lie a distance of 0.25X from the first end and the second annular groove is positioned to lie a distance of 0.25X from the second end of the sprocket.

35. The bearing assembly of claim 32, wherein the one or more annular grooves of the sprocket are defined by an interior wall of the sprocket having a U-shaped cross-section and the one or more annular grooves each have a width W along the length of the bearing and a depth D orthogonal to the width W, and W is greater than D.

* * * * *